United States Patent Office 3,442,626
Patented May 6, 1969

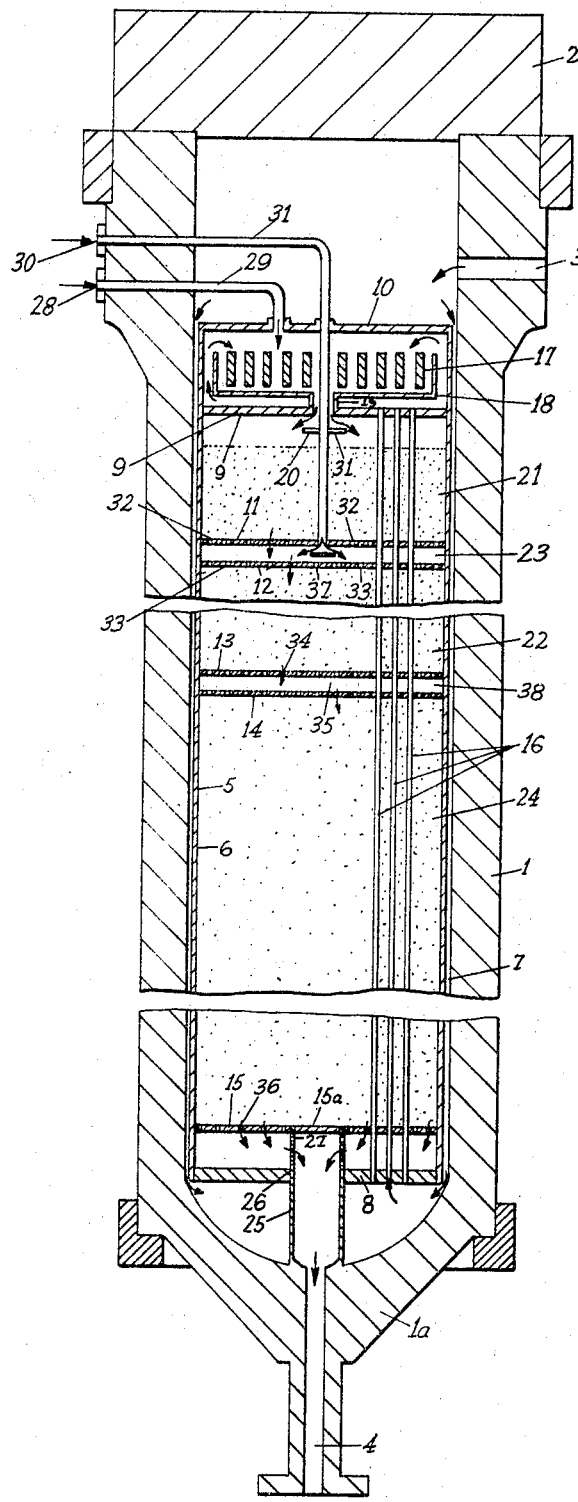

3,442,626
AMMONIA CONVERTER
Robert Y. Browne, Louisville, Ky., assignor to Girdler Corporation, Louisville, Ky., a corporation of Ohio
Filed Jan. 8, 1965, Ser. No. 424,238
Int. Cl. C01c 1/04
U.S. Cl. 23—288          5 Claims

ABSTRACT OF THE DISCLOSURE

A converter for the syntheses of ammonia and the like comprising an elongated casing having an inlet means at the top, an outlet means at the bottom and an internal sleeve spaced from the interior surfaces of the casing and extending through the greater part of its length. The sleeve is closed at the top by a sleeve closure means and is provided at the bottom with means communicating with the casing outlet. The sleeve is divided into a first chamber housing a start up heater, two catalyst beds and a bed of inert, gas-pervious material. Heat exchange tubes extend from the bottom of the sleeve to the chamber containing the start up heater and means are provided for introducing feed gas directly into the start up heater chamber and to a point between the two catalyst beds.

---

This invention relates to an improved form of ammonia converter, and more particularly to a new form of heat exchange and temperature control arrangement for converters for ammonia synthesis.

In the practice of the standard process for the synthesis of ammonia, synthesis gas containing hydrogen and nitrogen in the desired ratio is delivered to a catalytic ammonia converter. In its usual form, such a converter comprises an elongated, vertically oriented pressure vessel containing (from top to bottom) a heater, a catalyst basket, and a heat exchanger. The heat exchanger and catalyst basket are joined together by a complex baffle arrangement. Synthesis gas is introduced into the pressure vessel near its top, and is caused to travel downwardly between the inside surface of the vessel and the outside surfaces of the housings for the above mentioned elements. Near the bottom of the vessel, the gas is introduced into the lower portion of the heat exchanger where it is caused to pass upwardly about a plurality of baffles, and a plurality of heat exchanger tubes carrying downwardly flowing product gas. From the heat exchanger, the synthesis gas flows upwardly through a complex baffle assembly which directs its flow, still in the upward direction through catalyst cooling tubes extending vertically through the catalyst basket. From the catalyst cooling tubes, the synthesis gas is conducted downwardly through the heating means and thence into the catalyst bed where the reaction takes place. From the catalyst bed, the product gas is caused to flow downwardly through another portion of the complex baffle assembly, which directs its flow through the heat exchanger tubes. The product gas is collected from the heat exchanger tubes and passes out through the converter outlet for further processing.

In an ammonia converter of the type just described, the synthesis gas is heated to reaction temperature partly by heat exchange in the heat exchanger and partly by heat exchange in the catalyst basket. The heater means provided at the top of the converter is employed mainly during start-up of the converter. The synthesis gas passing up through the catalyst cooling tubes permits control of the maximum temperature in the catalyst bed. For further control, a second inlet may be provided in the bottom of the converter and so arranged that synthesis gas entering the converter by way of this second inlet is caused to bypass the heat exchanger section. In this way the temperature of the gas passing up through the catalyst cooling tubes may be reduced.

It is a primary object of the present invention to provide an ammonia converter constituting a far less complicated structure which is easier and cheaper to manufacture and maintain.

It is an object of the present invention to provide an ammonia converter with a simplified catalyst basket and heat exchanger construction characterized by the elimination of the complex baffle assembly between the catalyst basket and the heat exchanger unit. This results in a lower manufacturing cost and eliminates the chance of internal gas leakage at these locations.

It is an object of the present invention to provide an ammonia converter having a greatly simplified outlet connection, and eliminating the secondary heat exchanger bypass inlet, thereby reducing the opportunity for internal gas leakage at these locations.

It is an object of the present invention to provide an ammonia converter wherein vertically oriented tubes function both as heat exchanger tubes and catalyst cooling tubes.

It is an object of the present invention to provide an ammonia converter wherein means are provided for temperature control at the inlet to the catalyst bed, and within the bed, by the combination of cooling tubes and direct gas mixing. This results in a more complete conversion of the gas mixture into ammonia, and a more efficient and more stable overall operation.

These and other objects of the invention which will be described hereinafter, or which will be apparent to one skilled in the art upon reading these specifications, are accomplished by that structure and arrangement of parts of which an exemplary embodiment will now be described. Reference is made to the accompanying drawing wherein the ammonia converter of the present invention is illustrated in a somewhat simplified form in a vertical cross sectional view.

The ammonia converter of the present invention comprises an elongated pressure vessel 1, with an enclosed bottom portion 1a, and an enclosed top portion 2. The pressure vessel 1 is provided with inlet means 3 near its upper end and outlet means 4 at its lower end.

Within the pressure vessel 1 an elongated cylindrical housing 5 is provided having a cylindrical wall 6 of a diameter slightly less than the internal diameter of the pressure vessel. The wall 6 may be made of stainless steel or other suitable material, and may be provided with an external layer of suitable insulative material (not shown). The space between the wall 6 and the inside surface of the pressure vessel 1 comprises an annular gas passage 7 which will be more fully described hereinafter. The cylindrical member 5 is provided at its lower end with a tube sheet 8, affixed to the cylindrical wall 6 in gas-tight fashion. A second tube sheet 9 is provided in the upper portion of the cylindrical member 5, and is affixed to the cylindrical wall 6 in gas-tight fashion. The top of the cylindrical member 5 is provided with a gas-tight end plate 10. Additional foraminous plates are affixed to the cylindrical wall 6 as at 11 through 15. A plurality of vertically oriented tubes are supported at their bottom ends by the tube sheet 8 through which they extend, and at their top ends by the tube sheet 9 through which they also extend. The tubes are continuous and pass through the plates 11 to 15 inclusive. For purposes of clarity, only three such tubes are illustrated at 16, but it will be understood by one skilled in the art that the cylindrical member 5 will contain many such tubes.

A start-up heater (generally indicated at 17), is provided in the upper portion of the cylindrical member 5 between the cover plate 10 and the tube sheet 9. The start-up heater 17 is provided at its sides and bottom with a cover member 18 connected as at 19 with a central perforation 20 in the tube sheet 9 by means of a short collar. That portion of the cylindrical member 5 which lies between the tube sheet 9 and the foraminous plate 13 comprises the catalyst section of the ammonia converter. This catalyst section is divided into an upper portion 21 lying between the tube sheet 9 and the formainous plate 11, and a lower portion 22 lying between the foraminous plate 12 and the foraminous plate 13. The space 23 between the upper and lower catalyst chambers 21 and 22, and bounded by the foraminous plates 11 and 12, contains no catalyst. The portions 21 and 22 are filled as shown with any suitable ammonia conversion catalyst. Such catalysts are well known in the art.

It will be noted that plates 11 and 13 act as catalyst support plates. Depending on the size of catalyst used, these plates may be provided at their upper surfaces with catalyst support screens (not shown) to prevent the catalyst from passing through or clogging the perforations in the plates.

That section of the cylindrical member 5 which lies between the foraminous plate 14 and the foraminous plate 15 constitutes the heat exchanger section 24 of the ammonia converter. The heat exchanger section 24 may be filled or packed with an inert material of about the same size as the catalyst used in the catalyst chambers 21 and 22. Examples of inert material suitable for this use are used catalyst, alumina spheres, and other refractory materials in particle sizes sufficient to provide for free gas passage.

Beneath the foraminous plate 15 (which serves as a support for the inert material in the heat exchanger) the heat exchanger outlet 25 is provided. The upper end of the outlet is affixed to the central portion of the lower surface of the plate 15. This central portion 15a is preferably imperforate so that none of the inert material within the heat exchanger section 24 can enter the outlet 25. The tube sheet 8 is provided with a central perforation 26 through which the outlet 25 extends in gas-tight fashion. The lower end of the outlet is affixed to the pressure vessel 1 in a gas-tight joint, and opens into the converter outlet 4. That portion of the outlet 25 between the plate 15 and the tube sheet 18 is provided with a series of perforations 27 described hereinafter.

A second synthesis gas inlet 28 is illustrated near the top of the pressure vessel 1. This inlet is connected to the space below the cover plate 10 by means of a conduit 29 which extends through the cover plate 10.

A third synthesis gas inlet 30 is connected to the space 23 between the plates 11 and 12 by means of a conduit 31 which extends in a sealed fashion through the cover plate 10, the perforation 20 in the tube sheet 9, and the plate 11.

Briefly in the operation of the ammonia converter of the present invention, synthesis gas is caused to enter the inlet 3 and flow downwardly in the annular passage 7 between the inside surface of the pressure vessel 1 and the outside surface of the cylindrical shell 5. Upon reaching the bottom of the pressure vessel, the synthesis gas flows upwardly into the tubes 16 which extend through the tube sheet 8. From the upper ends of the tubes 16, the gas flows upwardly around the cover member 18 to the start-up heater 17. The gas is then caused to flow downwardly through the heater and the central perforation 20 in the tube sheet 9 into the catalyst containing section 21. To insure that the gas is dispersed throughout this catalyst bed, a baffle 31 may be located near the outlet of the perforation 20. From the catalyst section 21 the gas enters the space 23 through the openings 32 in the plate 11. From the space 23 the gas will continue its flow downwardly through the openings 33 in the plate 12 into the catalyst section 22. Product gas from the catalyst section 22 will flow through openings 34 in the plate 13 and similar openings in the plate 14 into the heat exchanger section 24. Having flowed downwardly through the inert material and about the tubes 16, the product gas will exit from the heat exchanger section via the opening 36 in the plate 15, and upon entering the heat exchanger outlet 25 through perforations 27, the gas will continue its downwardly flow and leave the pressure vessel 1 through the outlet 4.

It will be seen from the described construction that the incoming synthesis gas from the opening 3 will be brought to the reaction temperature partly by heat exchange with the product gas in the heat exchanger section 24, and partly by heat exchange with the catalyst bed in sections 21 and 22 when the apparatus is in full operation. When the apparatus is being started, the synthesis gases may be brought to the requisite reaction temperature by the electrical heater 17. The start-up heater is not used after the synthesis reaction is well started because sufficient heat will be generated by the reaction to raise the synthesis gas to reaction temperature during its passage through the tubes 16.

Control of the maximum temperature in the catalyst bed if the temperature tends to rise too high can be obtained by adding additional synthesis gas at inlets 28 or 30 or both. Gas entering inlet 28 and conduit 29 will mix with hot gases from the cooling tubes 16 and will lower the temeperature of the stream entering the catalyst bed 21 through the opening 20. Gas entering the converter through inlet 30 will enter the space 23 via the conduit 31 thus bypassing the catalyst bed 21. A cooling is obtained by the mixing of this fresh gas with the partially reacted gas from the catalyst bed 21. This mixing can be promoted by the use of a baffle 37 near the end opening of the conduit 31. It will be obvious from what has been said above that heat exchange between the catalysts in the chambers 21 and 22 and the process gases in the tubes 16 also tends to prevent the attainment of excessive temperatures in the catalyst chambers.

Thus it will be noted that the maximum temperature of that portion 21 of the catalyst bed can be accurately controlled by the gas entering inlet 28. The maximum temperature of that portion of the catalyst bed in section 22 can be accurately controlled by gas entering inlet 30. At the bottom of the catalyst bed, below plate 13 is an empty section 38 which separates the catalyst bed from the heat exchanger section 24. It will be understood by the skilled worker in the art that temperature measuring devices such as thermocouples, pyrometers and the like may be incorporated in the apparatus wherever a temperature reading is desired.

It has been found that the above described arrangement not only constitutes a considerably simplified converter structure, but also provides an improved temperature control and results in a more complete conversion of the synthesis gas to ammonia. The overall operation is more efficient and more stable. The heat exchanger structure, packed with inert material, permits a maximum heat transfer to take place between the hot exit gas from the catalyst bed and the incoming cold synthesis gas flowing upwardly through the tubes 16.

The embodiments of the invention in which an exclusive property or privilege is claimed are defined as follows:

1. A converter for the syntheses of ammonia and the like comprising an elongated casing having top and bottom closure means, a first inlet means for the entrance of gases adjacent the top of said casing, a sleeve within said casing extending through the greater part of its length and closed at the top by a sleeve closure means, said sleeve spaced from the interior surfaces of said casing so as to form an annular passageway for conducting gases entering through said first inlet means to a point below said sleeve, a tube plate adjacent the bottom of said sleeve, a tube plate in the upper part of said sleeve spaced from said sleeve closure means, a series of heat exchange tubes extending continuously between said tube plates and passing therethrough in a gas-tight fashion whereby gases entering said sleeve from below are carried to a point near the top thereof, said upper tube plate having a central opening for gases passing downwardly through said sleeve outside said tubes, a heating means in the space between said sleeve closure means and the upper one of said tube plates, outlet means at the bottom of said casing, means passing through the lower one of said tube plates, and connected with said outlet means at the bottom of said casing, whereby gases passing downwardly through said sleeve can exit from said converter, a plurality of transversely extending foraminous plates within said sleeve defining at least one catalyst bed and a bed of inert, gas-pervious material therebelow in the path of said downwardly passing gases, a second inlet means for the entrance of gases through said casing adjacent the upper part thereof and a conduit directly connecting said second inlet means with said space between the upper one of said tube plates and said sleeve closure means.

2. The structure claimed in claim 1 wherein said plurality of foraminous plates comprises 5 plates, a first one of said foraminous plates defining with said upper tube plate a first catalyst chamber, a second one of said foraminous plates spaced from the first and defining with a third foraminous plate a second catalyst chamber, a fourth one of said foraminous plates spaced from the third foraminous plate and defining with yet another foraminous plate a chamber for said bed of inert, gas-pervious material to maintain contact of said downwardly passing gases in said sleeve with said tubes.

3. The structure claimed in claim 2 wherein the fifth one of said foraminous plates is spaced from said lower tube plate, wherein said means passing through the lower one of said tube plates and connected with the said outlet means at the bottom of said casing comprises a tubular member having a portion extending from said lower tube plate to an imperforate central area of the said fifth foraminous plate, said portion having lateral perforations in it for the passage of gas.

4. The structure claimed in claim 3, including a third inlet means for the entrance of gases adjacent the top of said casing, and a conduit sealed about said third inlet means, passing downwardly through said sleeve top closure means and sealed thereto, extending through the said central opening in said upper tube plate and opening into the said space between the said first and second foraminous plates.

5. The structure claimed in claim 4 including a gas-distributing baffle located below the said central opening of said upper tube plate, and a gas-distributing baffle located in the space between the first and second ones of said foraminous plates.

References Cited
UNITED STATES PATENTS

| | | | |
|---|---|---|---|
| RE19,243 | 7/1934 | Richardson | 23—289 XR |
| 2,495,262 | 1/1950 | Keith | 23—288 XR |
| 2,861,873 | 11/1958 | Worn | 23—199 XR |
| 2,887,365 | 5/1959 | De Rycker et al. | 23—199 XR |
| 3,254,967 | 6/1966 | Wentworth | 23—199 XR |

MORRIS O. WOLK, *Primary Examiner.*

R. E. SERWIN, *Assistant Examiner.*

U.S. Cl. X.R.

23—198, 199, 289